US010115204B2

(12) United States Patent
Lee et al.

(10) Patent No.: US 10,115,204 B2
(45) Date of Patent: Oct. 30, 2018

(54) METHOD AND APPARATUS FOR PREDICTING EYE POSITION

(71) Applicant: Samsung Electronics Co., Ltd., Suwon-si, Gyeonggi-do (KR)

(72) Inventors: Seok Lee, Hwaseong-si (KR); Byong Min Kang, Yongin-si (KR); Jingu Heo, Yongin-si (KR); Dong Kyung Nam, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/386,680

(22) Filed: Dec. 21, 2016

(65) Prior Publication Data
US 2017/0193671 A1 Jul. 6, 2017

(30) Foreign Application Priority Data
Jan. 6, 2016 (KR) ........................ 10-2016-0001587

(51) Int. Cl.
*G06T 7/246* (2017.01)
*G06T 7/73* (2017.01)
*G06K 9/00* (2006.01)

(52) U.S. Cl.
CPC .......... *G06T 7/246* (2017.01); *G06K 9/00604* (2013.01); *G06T 7/73* (2017.01); *G06T 2207/10004* (2013.01); *G06T 2207/20028* (2013.01); *G06T 2207/30201* (2013.01)

(58) Field of Classification Search
CPC ........ G06T 7/246; G06T 7/73; G06K 9/00604
See application file for complete search history.

(56) References Cited

U.S. PATENT DOCUMENTS

| 5,517,021 A * | 5/1996 | Kaufman ............... A61B 3/113 250/221 |
| 5,742,332 A | 4/1998 | Imai et al. |
| 8,430,510 B2 | 4/2013 | Sugio et al. |
| 2002/0109701 A1 | 8/2002 | Deering |
| 2003/0067476 A1* | 4/2003 | Miller .................... G06F 3/011 345/598 |
| 2005/0273185 A1 | 12/2005 | Teiwes et al. |
| 2010/0225743 A1* | 9/2010 | Florencio ............. H04N 13/398 348/46 |
| 2011/0178784 A1 | 7/2011 | Sato et al. |
| 2012/0076438 A1 | 3/2012 | Oka et al. |
| 2014/0092006 A1 | 4/2014 | Boelter et al. |
| 2015/0049917 A1 | 2/2015 | Ciurea et al. |
| 2015/0172715 A1 | 6/2015 | Shimizu et al. |

(Continued)

FOREIGN PATENT DOCUMENTS

| JP | 2001-352595 A | 12/2001 |
| JP | 2010-131401 A | 6/2010 |

(Continued)

*Primary Examiner* — David F Dunphy
(74) *Attorney, Agent, or Firm* — Harness, Dickey & Pierce, P.L.C.

(57) ABSTRACT

Provided is an apparatus and method for predicting an eye position of user that may detect eye position coordinates in an image which is recently generated, determine a current prediction velocity of an eye movement based on a velocity of a previous eye movement, and predict the eye position coordinates of the user based on the detected eye position coordinates and the current prediction velocity.

18 Claims, 7 Drawing Sheets

(56) References Cited

U.S. PATENT DOCUMENTS

| | | | |
|---|---|---|---|
| 2015/0185484 A1 | 7/2015 | Choo et al. | |
| 2015/0338915 A1* | 11/2015 | Publicover | G06F 21/64 345/633 |
| 2016/0173863 A1 | 6/2016 | Kang et al. | |
| 2017/0278269 A1* | 9/2017 | Ebisawa | G06T 7/74 |

FOREIGN PATENT DOCUMENTS

| | | | |
|---|---|---|---|
| KR | 2012-0055404 A | 5/2012 | |
| KR | 20160070465 A | 6/2016 | |

* cited by examiner

METHOD AND APPARATUS FOR PREDICTING EYE POSITION

CROSS-REFERENCE TO RELATED APPLICATION

This application claims under 35 U.S.C. § 119 to Korean Patent Application No. 10-2016-0001587, filed on Jan. 6, 2016, at the Korean Intellectual Property Office, the entire contents of which are incorporated herein by reference in its entirety.

BACKGROUND

1. Field

At least one example embodiment relates to a method and apparatus for predicting an eye position, and more particularly, to a method and apparatus for predicting an eye position using an image obtained by photographing a user.

2. Description of the Related Art

A three-dimensional (3D) display of a view tracking type may detect eye positions of a viewer and convert content into stereo images corresponding to both eyes of the viewer. A single panel image may be generated based on the converted stereo images, and the panel image may be provided for the viewer. When a time is delayed in each process, the panel image may not be provided for the viewer in real-time. When the panel image is not provided in real-time due to the time delay in each process, a 3D image to be provided for the viewer may not appropriately show a converted eye position of the viewer.

SUMMARY

Some example embodiments relate to a method of predicting an eye position.

In some example embodiments, the method may include obtaining current eye position coordinates $x_n$ in a first image, updating a first history of a velocity of an eye movement using the current eye position coordinates $x_n$, determining a current prediction velocity $v^p_n$ of the eye movement based on the first history, and predicting current prediction eye position coordinates $x^p_n$ using the current prediction velocity $v^p_n$.

The updating may include updating the first history using a first in first out (FIFO) method.

The updating may include calculating a current velocity $v_n$ based on the current eye position coordinates $x_n$, previous eye position coordinates $x_{n-1}$, and an image photographing cycle, and updating the first history by adding the current velocity $v_n$ to the first history.

The determining may include determining a prediction mode based on a previous prediction velocity $v^p_{n-1}$ of the eye movement, and determining the current prediction velocity $v^p_n$ by applying a filter corresponding to the prediction mode to the first history, wherein the previous prediction velocity $v^p_{n-1}$ is a prediction velocity of the eye movement determined with respect to a second image generated before the first image.

The determining of the prediction mode may include comparing the previous prediction velocity $v^p_{n-1}$ to a threshold value, and determining a mode to be any one of a fast mode and a slow mode based on a result of the comparing.

The determining of the prediction mode may include comparing a difference between the first history and a second history including prediction velocities determined with respect to a plurality of images, the second history including the previous prediction velocity $v^p_{n-1}$, and determining a mode to be any one of a normal mode and an eccentric mode based on a result of the comparing.

The filter may be a bilateral filter, and a parameter of the bilateral filter may be adaptively determined based on the prediction mode.

The first history may include a preset number of pieces of velocity information.

The predicting of the current prediction eye position coordinates $x^p_n$ may include predicting the current prediction eye position coordinates $x^p_n$ based on the current eye position coordinates $x_n$, the current prediction velocity $v^p_n$, and a system delay value.

The system delay value may be a difference between a point in time at which the first image is photographed and a point in time at which the current prediction eye position coordinates $x^p_n$ are determined.

The method may further include photographing the first image.

Some example embodiments relate to an apparatus for predicting an eye position.

In some example embodiments, the apparatus may include a memory configured to store a first history of a velocity of an eye movement, and a processor configured to obtain current eye position coordinates $x_n$ in a first image, update the first history using the current eye position coordinates $x_n$, determine a current prediction velocity $v^p_n$ of the eye movement based on the first history, and predict current prediction eye position coordinates $x^p_n$ using the current prediction velocity $v^p_n$.

The processor may be configured to update the first history using a first in first out (FIFO) method.

The processor may be configured to calculate a current velocity $v_n$ based on the current eye position coordinates $x_n$, previous eye position coordinates $x_{n-1}$, and an image photographing cycle, and update the first history by adding the current velocity $v_n$ to the first history.

The processor may be configured to determine a prediction mode based on a previous prediction velocity $v^p_{n-1}$ of the eye movement and determine the current prediction velocity $v^p_n$ by applying a filter corresponding to the prediction mode to the first history, and the previous prediction velocity $v^p_{n-1}$ may be a prediction velocity of the eye movement determined with respect to a second image generated before the first image.

The filter may be a bilateral filter and at least one parameter of the bilateral filter is adaptively determined based on the prediction mode.

The processor may be configured to predict the current prediction eye position coordinates $x^p_n$ based on the current eye position coordinates $x_n$, the current prediction velocity $v^p_n$, and a system delay value.

The system delay value may be a difference between a point in time at which the first image is photographed and a point in time at which the current prediction eye position coordinates $x^p_n$ are determined.

The apparatus may further include a camera configured to photograph the first image.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
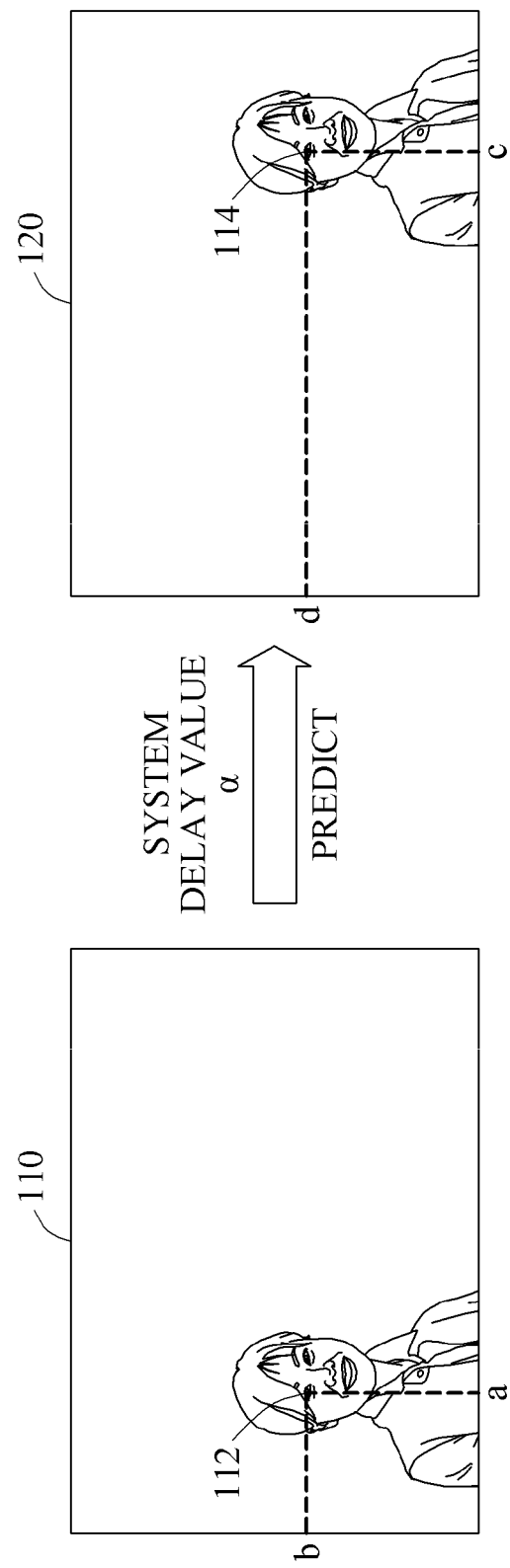
FIG. 1 illustrates an example of a prediction eye position according to at least one example embodiment.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of a prediction eye position according to at least one example embodiment.

A pre-predicted position of a user may be used in connection with various fields, for example, in an apparatus for displaying a three-dimensional (3D) image. As a method of detecting a position of a user, a method of detecting a position of a user in an image obtained by photographing the user may be used. Relatively, the method may accurately detect the position of the user, but an error may occur due to a processing delay caused by a time taken for photographing an image and analyzing the image.

To correct the processing delay, a current position of the user may be predicted at a moment when the current position of the user is required. For example, an eye position of the user may be predicted based on eye position coordinates detected using an image and a distance of an eye position movement during the processing delay.

For example, a user may be identified and eye position coordinates 112 of the user may be detected from a first image 110. The eye position coordinates 112 may be coordinates in the first image 110. An eye movement during a processing delay or a system delay, for example, a time α, may be predicted. Eye position coordinates 114 may be predicted as coordinates in a virtual second image 120 based on the eye position coordinates 112 and the predicted eye movement. The second image 120 may be an image corresponding to the first image 110, and the first image 110 and the second image 120 may be obtained based on an identical intrinsic parameter of a camera. The second image 120 may be understood as an image photographed at a point in time at which the eye position coordinates 114 are required. Detailed descriptions of a method of predicting eye position coordinates will be provided with reference to FIGS. 2 through 9.

In FIG. 1, a term "first image" and a term "second image" are used for classifying images, and a first image and a second image do not indicate an identical time relationship between images referred to in following descriptions. For example, according to descriptions provided with reference to drawings, a second image may be generated before a first image is generated.

Figure 2:
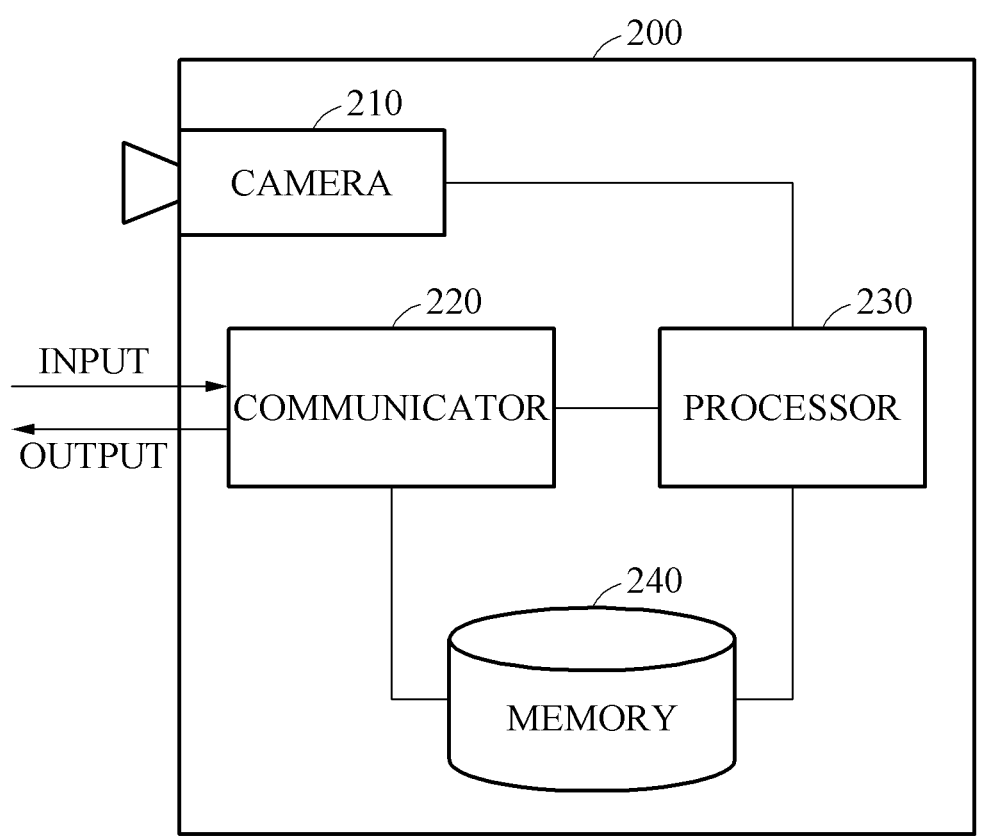
FIG. 2 is a block diagram illustrating an example of an apparatus for predicting an eye position according to at least one example embodiment.

FIG. 2 is a block diagram illustrating an example of an apparatus for predicting an eye position according to at least one example embodiment.

An apparatus for predicting an eye position, hereinafter referred to as an eye position predicting apparatus 200, includes a camera 210, a communicator 220, a processor 230, and/or a memory 240.

The camera 210 generates a first image by photographing a user. For example, the camera 210 may photograph the user positioned around the eye position predicting apparatus 200. The communicator 220 exchanges data or information with an external apparatus or other apparatuses of the eye position predicting apparatus 200. The processor 230 processes data received by the communicator 220 and data stored in the memory 240. The memory 240 stores the data received by the communicator 220 and data processed by the processor 230.

Detailed descriptions of the camera 210, the communicator 220, the processor 230, and the memory 240 will be provided with reference to FIGS. 3 through 9.

Figure 3:
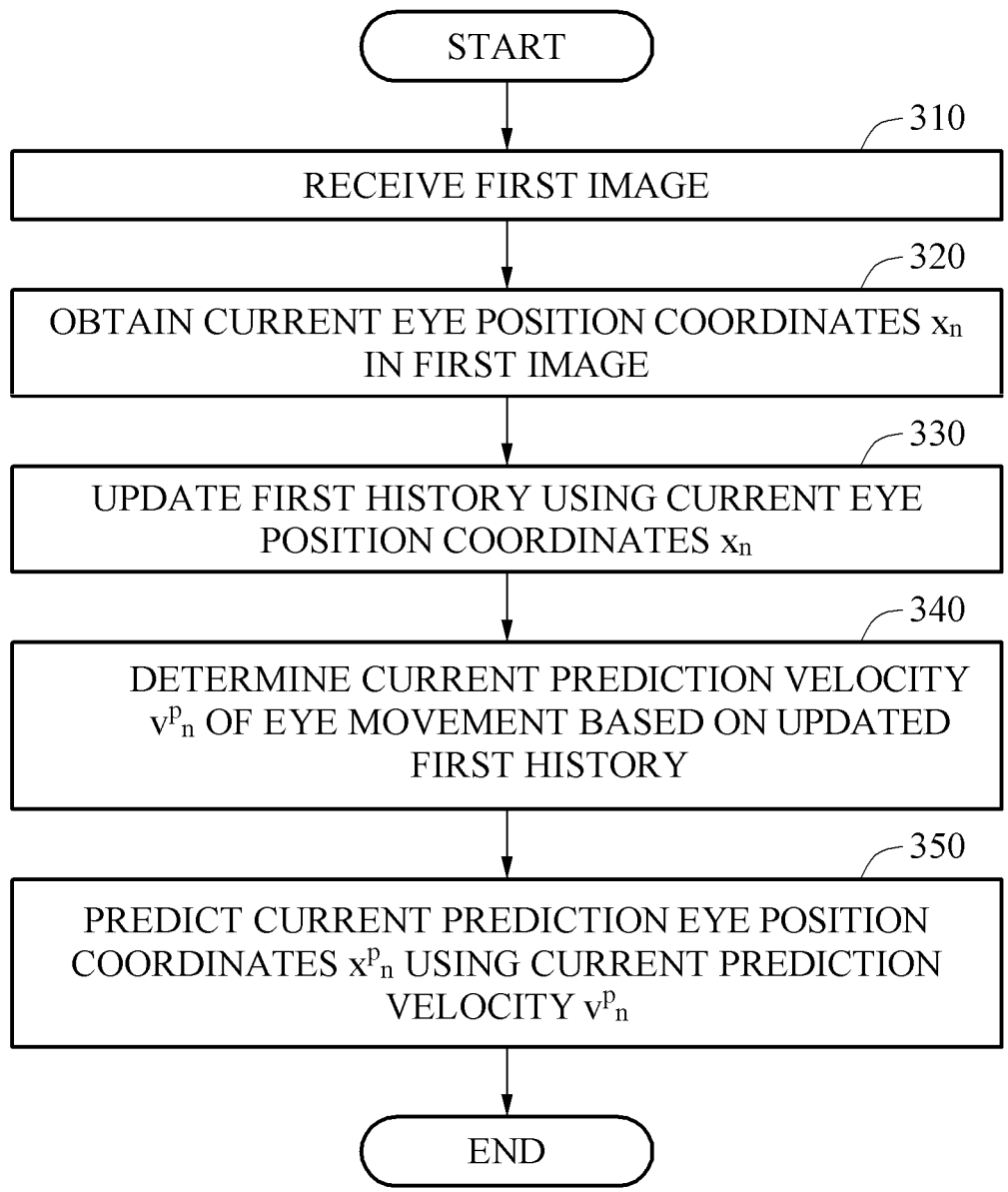
FIG. 3 is a flowchart illustrating an example of a method of predicting an eye position according to at least one example embodiment.

FIG. 3 is a flowchart illustrating an example of a method of predicting an eye position according to at least one example embodiment.

Operation 310 may be performed by the communicator 220, and operations 320 through 350 may be performed by the processor 230.

In operation 310, a first image is received. For example, the first image may be a user image photographed by the camera 210.

In operation 320, a face of the user in the first image may be detected and current eye position coordinates $x_n$ in the face may be obtained. The obtained current eye position coordinates $x_n$ may be coordinates in the first image. n may indicate a current or most recent order. For example, n−1 may indicate an order previous to a current order.

In operation 330, a first history of a velocity of an eye movement is updated using the current eye position coordinates $x_n$. A current velocity $v_n$ of the eye movement with respect to the most recently detected current eye position coordinates $x_n$ may be additionally included in the first history.

For example, when $x_n$ is an x-th detected eye position, the current velocity $v_n$ of the eye movement with respect to $x_n$ may be calculated using Equation 1.

$$v_n = (x_n - x_{n-1})/t_c \qquad \text{[Equation 1]}$$

$x_{n-1}$ denotes previous prediction eye position coordinates detected from an image temporally close to $x_n$, for example, an image photographed before the first image is photographed, and $t_c$ denotes an image photographing cycle. In another example, $t_c$ may be a difference between points in time at which images are photographed.

The first history may be a set including velocities of the calculated eye movements. The first history may include a predetermined number k of velocities, and k is a natural number. When a number of the velocities of the calculated eye movements exceeds k, a relatively earlier calculated velocity among the k velocities included in the first history may be deleted from the first history. The first history is updated using a first in first out (FIFO) method. The first history may be expressed as Equation 2.

$$V_n = \{v_n, v_{n-1}, \ldots, v_{n-k+1}\} \qquad \text{[Equation 2]}$$

When $v_n$ is added to the first history of $V_{n-1}$, the first history of $V_{n-1}$ may be updated to the first history of $V_n$. When the first history of $V_{n-1}$ is updated to the first history of $V_n$, a velocity of $v_{n-k}$ may be deleted from the first history.

In operation 340, a current prediction velocity $v^p_n$ of the eye movement may be determined based on the updated first history. The current prediction velocity $v^p_n$ of the eye movement may be a movement velocity from a point in time at which the first image is photographed to a point in time at which current prediction eye position coordinates $x^p_n$ are to be predicted. A difference between the point in time at which the first image is photographed and the point in time at which the current prediction eye position coordinates $x^p_n$ are to be predicted may be a system delay value.

For example, the current prediction velocity $v^p_n$ of the eye movement may be determined based on the first history. The current prediction velocity $v^p_n$ may be calculated using Equation 3.

$$v^p_n = f(V_n) \qquad \text{[Equation 3]}$$

$v^p_n$ denotes a calculated current prediction velocity and f(x) denotes a function or a filter in which the first history is an input and the current prediction velocity $v^p_n$ is an output.

In operation 350, the current prediction eye position coordinates $x^p_n$ are predicted using the current prediction velocity $v^p_n$. For example, the current prediction eye position coordinates $x^p_n$ may be calculated using Equation 4.

$$x^p_n = x_n \alpha \times v^p_n \qquad \text{[Equation 4]}$$

$x^p_n$ denotes calculated current prediction eye position coordinates, and $\alpha$ denotes a system delay value. Thus, the current prediction eye position coordinates $x^p_n$ may be predicted based on eye position coordinates, the current prediction velocity $v^p_n$, and the system delay value $\alpha$.

Figure 4:
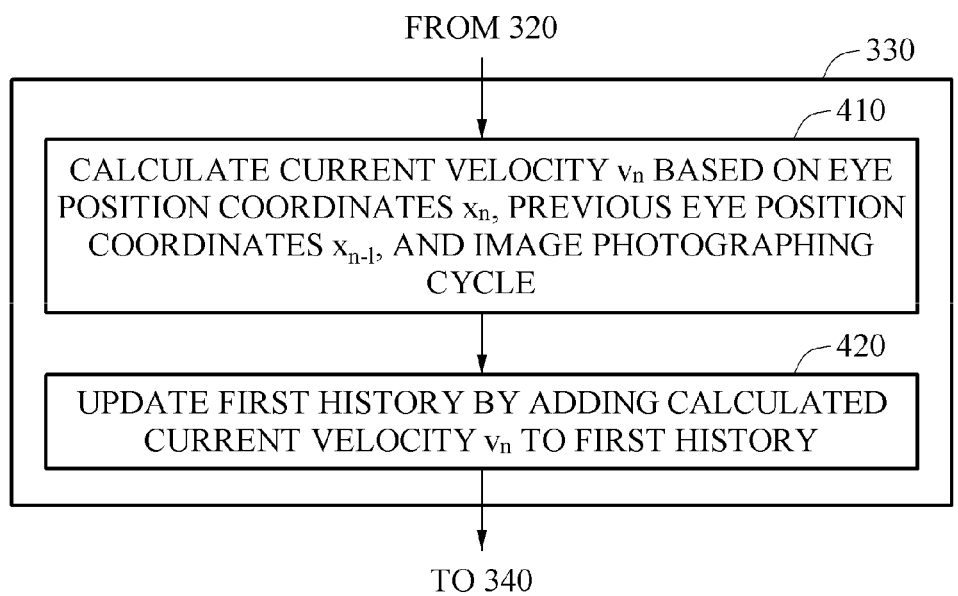
FIG. 4 is a flowchart illustrating a method of updating a first history according to at least one example embodiment.

FIG. 4 is a flowchart illustrating a method of updating a first history according to at least one example embodiment.

Operation 330 described with reference to FIG. 3 includes operations 410 and 420.

In operation 410, a current velocity $v_n$ of an eye movement is calculated based on eye position coordinates $x_n$, previous eye position coordinates $x_{n-1}$, and an image photographing cycle. For example, the current velocity $v_n$ may be calculated using Equation 1.

In operation 420, a first history is updated by adding the calculated current velocity $v_n$ to the first history. For example, the first history to which the current velocity $v_n$ is added may be expressed as shown in above Equation 2.

Figure 5:
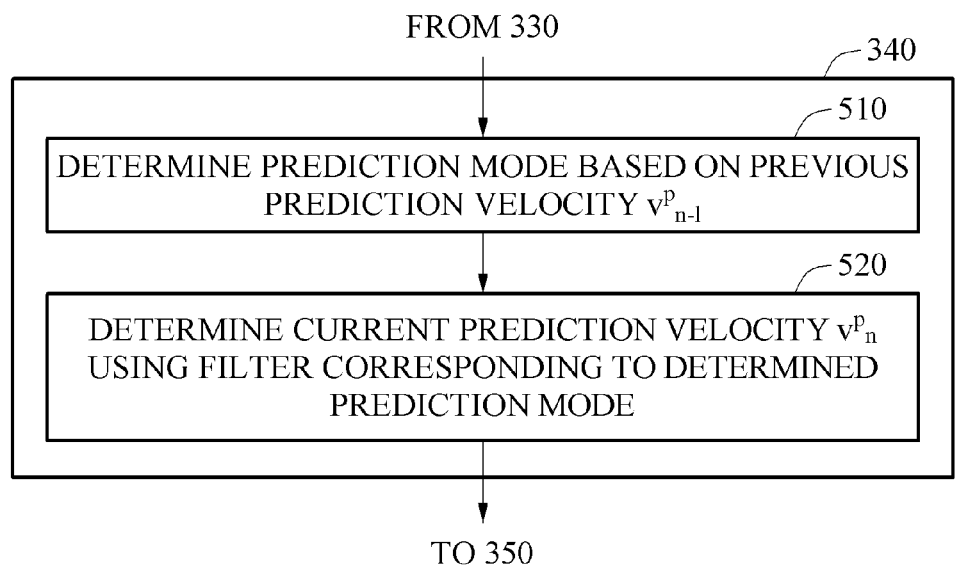
FIG. 5 is a flowchart illustrating an example of a method of determining a current prediction velocity of an eye movement according to at least one example embodiment.

FIG. 5 is a flowchart illustrating an example of a method of determining a current prediction velocity of an eye movement according to at least one example embodiment.

To determine a current prediction velocity $v^p_n$ of an eye movement, an aspect or a state of a previous eye movement may be considered. For example, to determine the current prediction velocity $v^p_n$, a prediction mode for determining the current prediction velocity $v^p_n$ may be determined based on a previous prediction velocity $v^p_{n-1}$ of the eye movement. A method of determining the current prediction velocity $v^p_n$ based on the previous prediction velocity $v^p_{n-1}$ may be performed through operations 510 and 520. Operation 340 described with reference to FIG. 3 may include operations 510 and 520.

In operation 510, the prediction mode of the eye movement is determined based on the previous prediction velocity $v^p_{n-1}$. For example, any one of a plurality of prediction modes may be determined based on the previous prediction velocity $v^p_{n-1}$. The previous prediction velocity $v^p_{n-1}$ may be a prediction velocity of the eye movement determined with respect to a second image generated before the first image.

In operation 520, the current prediction velocity $v^p_n$ is determined using a filter corresponding to the determined prediction mode. For example, the filter is a bilateral filter, and a parameter of the bilateral filter may be adaptively determined based on the prediction mode. To determine the current prediction velocity $v^p_n$, the filter may include a parameter for a range kernal indicating a degree of reflection of each velocity of a first history, and a parameter for a temporal kernal indicating a degree of reflection of a time difference between the first image and each previous image.

A weight indicating a degree of reflection of each previous velocity of the first history to determine the current prediction velocity $v^p_n$ using the filter may be calculated. The weight may be calculated using Equation 5.

$$w(n, l) = \exp\left(-\frac{(n-l)^2}{\sigma_t^2} - \frac{(v(n) - v(l))^2}{\sigma_r^2}\right) \qquad \text{[Equation 5]}$$

w(n, 1) denotes a weight of an l-th previous velocity $v_l$ of a current (n-th) velocity. v(n) denotes a current velocity of a calculated n-th eye movement, and v(1) denotes the previous velocity $v_l$ of a calculated l-th eye movement. When a number of velocities included in the first history is k, a range of 1 may be n−k+1 through n−1. $\sigma_t$ denotes a parameter for the temporal kernal and $\sigma_r$ denotes a parameter for the range kernal. $\sigma_t$ and $\sigma_r$ may be adaptively determined based on the prediction mode.

The current prediction velocity $v^p_n$ may be calculated using Equation 6.

$$v^p_n = \frac{1}{w} \sum_{l=n-k+1}^{n-1} v_l * w(n, l) \qquad \text{[Equation 6]}$$

$v^p_n$ denotes a current prediction velocity and W denotes a sum of weights. The sum W of weights may be calculated using Equation 7.

$$W = \sum_{l=n-k+1}^{n-1} w(n, l) \qquad \text{[Equation 7]}$$

Figure 6:
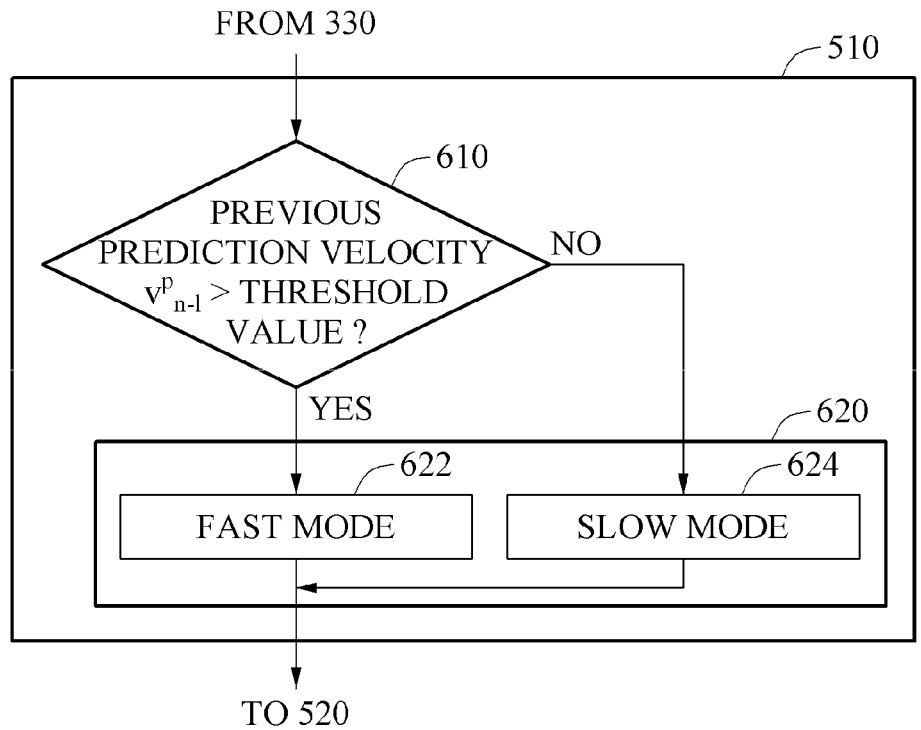
FIG. 6 is a flowchart illustrating an example of a method of determining a prediction mode according to at least one example embodiment.

FIG. 6 is a flowchart illustrating an example of a method of determining a prediction mode according to at least one example embodiment.

In an example, a prediction mode may be determined based on a previous most recently determined prediction velocity $v^p_{n-1}$.

Operation 510 described with reference to FIG. 5 may include operations 610 and 620.

In operation 610, the previous prediction velocity $v^p_{n-1}$ is compared to a threshold value.

In operation 620, a mode of any one of a fast mode 622 and a slow mode 624 is determined based on a result of the comparing. When the previous prediction velocity $v^p_{n-1}$ is greater than the threshold value, the fast mode 622 may be determined. When the previous prediction velocity $v^p_{n-1}$ is less than or equal to the threshold value, the slow mode 624 may be determined.

The fast mode 622 is used when an eye movement is relatively fast, thus in fast mode 622 a weight of a most recently calculated velocity in a first history may be relatively great. The slow mode 624 is used when an eye movement is relatively slow, and since the eye movement is relatively slow, a weight of the slow mode 624 may be greater than the weight of the fast mode 622, even when the velocity is previously calculated. The slow mode 624 does not allocate a relatively large weight of a predetermined or desired velocity, thus in slow mode 624 the invention may be more robust in withstanding an error caused by a noise component.

<Normal Mode and Eccentric Mode>

Figure 7:
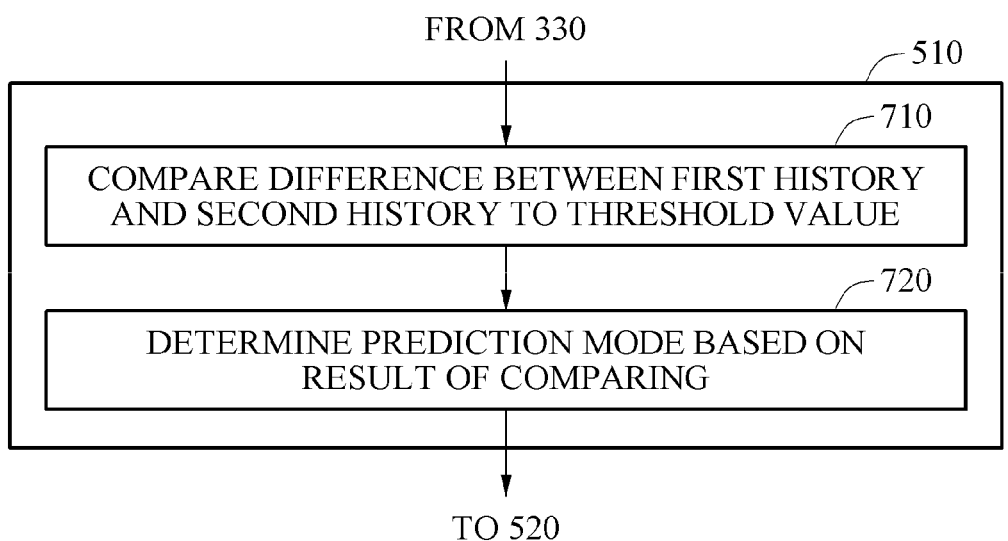
FIG. 7 is a flowchart illustrating another example of a method of determining a prediction mode according to at least one example embodiment.

FIG. 7 is a flowchart illustrating another example of a method of determining a prediction mode according to at least one example embodiment.

A prediction mode may be determined based on a difference between a first history and a second history including prediction velocities determined with respect to a plurality of images. The second history may be expressed as shown in Equation 8.

$$V^p_n = \{v^p_n, v^p_{n-1}, \ldots, v^p_{n-k+1}\} \qquad \text{[Equation 8]}$$

Operation 510 described with reference to FIG. 5 may include operations 710 and 720.

In operation 710, the difference between the first history and the second history is compared to a threshold value. For example, the difference may be calculated using Equation 9. $d(V_{n-1}, V^p_{n-1})$ denotes the difference.

$$d(V_{n-1}, V^p_{n-1}) = \sqrt{((v_{n-1} - v^p_{n-1})^2 + \cdots + (v_{n-k+1} - v^p_{n-k+1})^2)} \qquad \text{[Equation 9]}$$

In operation 720, based on a result of the comparing, a mode of any one of a normal mode and an eccentric mode is determined. When the difference is less than the threshold value, the normal mode may be determined. When the difference is greater than or equal to the threshold value, the eccentric mode may be determined.

The normal mode may be a prediction mode in which a difference between a predicted velocity and a velocity calculated based on coordinates of an image is not relatively great. The eccentric mode may be a prediction mode in which an eye movement is verified to be irregular. In the normal mode, a parameter may be set such that a weight of each velocity of the first history is regularly calculated when compared to that of the eccentric mode.

Figure 8:
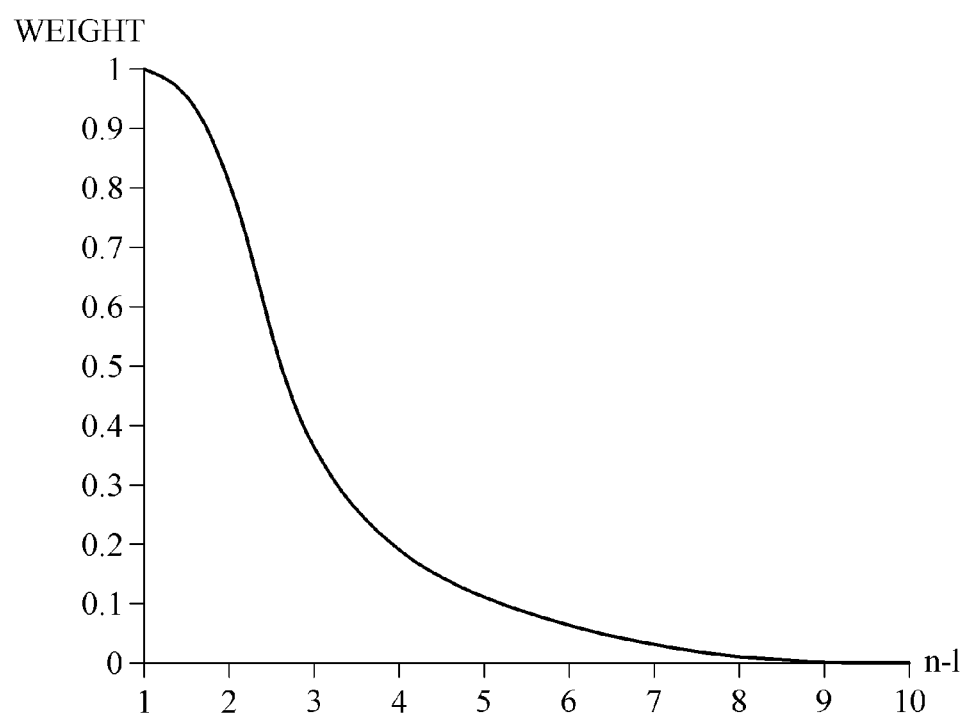
FIGS. 8 and 9 are graphs illustrating an example of a weight of a bilateral filter according to at least one example embodiment.
Figure 9:
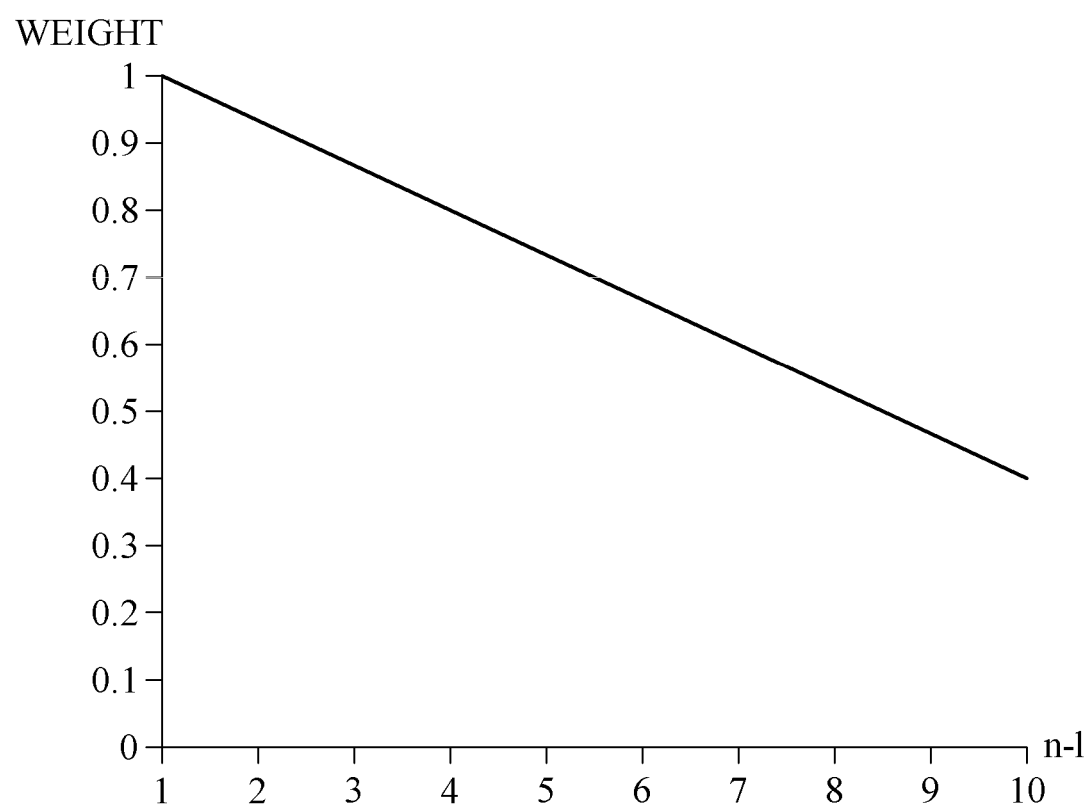

FIGS. 8 and 9 are graphs illustrating an example of a weight of a bilateral filter according to at least one example embodiment.

In FIGS. 8 and 9, an x-axis indicates a temporal difference between a velocity $v_l$ for determining a current prediction velocity $v^p_n$ and a most recently calculated current velocity $v_n$. n−1 is a most recently calculated velocity as a value of n−1 is small. A y-axis indicates a calculated weight.

Comparing FIGS. 8 and 9, a relatively high weight is assigned with respect to the most recently calculated velocity indicated in FIG. 8 compared to that indicated in FIG. 9. For example, FIG. 8 illustrates a weight for a fast mode or an eccentric mode, and FIG. 9 illustrates a weight for a slow mode or a normal mode.

A method of predicting an eye position described with reference to FIGS. 1 through 9 may reduce an error of the eye position occurring due to latency between an input end of a camera and an output end of a system. The method of predicting an eye position may be applied to a view tracking three-dimensional (3D) display of a glassless type. For example, the method of predicting an eye position may be implemented in software to be embodied in the 3D display. In another example, the method of predicting an eye position may be implemented in an application to be installed in a mobile terminal.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of predicting an eye position, the method comprising:
    receiving a first image photographed by a camera;
    obtaining current eye position coordinates $x_n$ in the first image by detecting a face of a user in the first image;
    calculating a current velocity $v_n$ based on the current eye position coordinates $x_n$, a previous eye position coordinates $x_{n-1}$ in a second image generated before the first image, and a difference between points in time at which the first image and the second image are photographed; and
    updating a first history of a velocity of an eye movement by adding the current velocity $v_n$ to the first history;
    determining a current prediction velocity $v^p_n$ of the eye movement based on the first history and a previous prediction velocity $v^p_{n-1}$ of the eye movement with respect to the second image; and
    predicting current prediction eye position coordinates $x^p_n$ using the current prediction velocity $v^p_n$.

2. The method of claim 1, wherein the updating comprises updating the first history using a first in first out (FIFO) method.

3. The method of claim 1, wherein the determining comprises:
    determining a prediction mode based on the previous prediction velocity $v^p_{n-1}$ of the eye movement; and
    determining the current prediction velocity $v^p_n$ by applying a filter corresponding to the prediction mode to the first history.

4. The method of claim 3, wherein the determining of the prediction mode comprises:
    comparing the previous prediction velocity $v^p_{n-1}$ to a threshold value; and
    determining a mode to be any one of a fast mode and a slow mode based on a result of the comparing.

5. The method of claim 3, wherein the determining of the prediction mode comprises:
    comparing a difference between the first history and a second history comprising prediction velocities determined with respect to a plurality of images, the second history including the previous prediction velocity $v^p_{n-1}$; and
    determining a mode to be any one of a normal mode and an eccentric mode based on a result of the comparing.

6. The method of claim 3, wherein the filter is a bilateral filter, and at least one parameter of the bilateral filter is adaptively determined based on the prediction mode.

7. The method of claim 1, wherein the first history includes a preset number of pieces of velocity information.

8. The method of claim 1, wherein the predicting of the current prediction eye position coordinates $x^p_n$ comprises predicting the current prediction eye position coordinates $x^p_n$ based on the current eye position coordinates $x_n$, the current prediction velocity $v^p_n$, and a system delay value.

9. The method of claim 8, wherein the system delay value is a difference between a point in time at which the first image is photographed and a point in time at which the current prediction eye position coordinates $x^p_n$ are determined.

10. The method of claim 1, further comprising:
    photographing the first image.

11. A non-transitory computer-readable medium storing program code that, when executed by a processor, performs the method of claim 1.

12. An apparatus for predicting an eye position, the apparatus comprising:
    a memory configured to store a first history of a velocity of an eye movement; and
    a processor configured to:
        receive a first image photographed by a camera,
        obtain current eye position coordinates $x_n$ in the first image by detecting a face of a user in the first image,
        calculate a current velocity $v_n$ based on the current eye position coordinates $x_n$, a previous eye position coordinates $x_{n-1}$ in a second image generated before the first image, and a difference between points in time at which the first image and the second image are photographed,
        update the first history of a velocity of an eye movement by adding the current velocity $v_n$ to the first history,
        determine a current prediction velocity $v^p_n$ of the eye movement based on the first history and a previous prediction velocity $v^p_{n-1}$ of the eye movement with respect to the second image, and
        predict current prediction eye position coordinates $x^p_n$ using the current prediction velocity $v^p_n$.

13. The apparatus of claim 12, wherein the processor is configured to update the first history using a first in first out (FIFO) method.

14. The apparatus of claim 12, wherein the processor is configured to determine a prediction mode based on the previous prediction velocity $v^p_{n-1}$ of the eye movement and determine the current prediction velocity $v^p_n$ by applying a filter corresponding to the prediction mode to the first history.

15. The apparatus of claim 14, wherein the filter is a bilateral filter and a parameter of the bilateral filter is adaptively determined based on the prediction mode.

16. The apparatus of claim 12, wherein the processor is configured to predict the current prediction eye position coordinates $x^p_n$ based on the current eye position coordinates $x_n$, the current prediction velocity $v^p_n$, and a system delay value.

17. The apparatus of claim 16, wherein the system delay value is a difference between a point in time at which the first image is photographed and a point in time at which the current prediction eye position coordinates $x^p_n$ is determined.

18. The apparatus of claim 12, further comprising:
a camera configured to photograph the first image.

* * * * *